United States Patent [19]
Higasa et al.

[11] Patent Number: 5,111,377
[45] Date of Patent: May 5, 1992

[54] INTERCONNECTION FOR ELECTRIC POWER SYSTEM

[75] Inventors: Hiromasa Higasa; Fumihiko Ishikawa; Shigenori Matsumura, all of Takamatsu; Sueo Sakata; Masayoshi Kumano, both of Amagasaki, all of Japan

[73] Assignees: Shikoku Research Institute Incorporated, Takamatsu; Mitsubishi Denki Kabushiki Kaisha, Tokyo, both of Japan

[21] Appl. No.: 663,168

[22] Filed: Mar. 1, 1991

[30] Foreign Application Priority Data
Mar. 2, 1990 [JP] Japan .................................. 2-52099

[51] Int. Cl.$^5$ ............................................ H92M 7/537
[52] U.S. Cl. ........................................ 363/95; 363/97; 363/98; 363/131; 363/132
[58] Field of Search ................... 363/41, 95, 97, 98, 363/131, 132

[56] References Cited

U.S. PATENT DOCUMENTS

| | | |
|---|---|---|
| 3,659,060 | 4/1972 | Wolff et al. |
| 4,802,077 | 1/1989 | Fujii et al. ................ 363/97 X |
| 4,820,891 | 4/1989 | Tanaka et al. ............. 363/97 X |

FOREIGN PATENT DOCUMENTS 62-114435  5/1987  Japan .

Primary Examiner—Steven L. Stephan
Assistant Examiner—Emanuel Todd Voeltz
Attorney, Agent, or Firm—Oblon, Spivak, McClelland, Maier & Neustadt

[57] ABSTRACT

In a power interconnection system between an electric power system and a power converter which makes AC power from a DC power source, a positive feed-back loop is constituted so as to include a frequency deviation detector, a band-pass filter, an inert zone circuit, an amplifier, an adder, a phase controller, an inverter controller, an inverter and an interconnection reactor. Thereby a sufficiently great frequency fluctuation is made after opening of a branch line switch, so as to produce a frequency abnormality signal to be given to a disconnection switch; and disconnection is made certainly.

2 Claims, 10 Drawing Sheets

INTERCONNECTION FOR ELECTRIC POWER SYSTEM

FIELD OF THE INVENTION AND RELATED ART STATEMENT

1. Field of the Invention

The present invention relates to a system of interconnection for supplying electric power to load by connecting an inverter for converting DC power to AC power and an electric power system to the load.

More particularly the present invention relates to the interconnection system which has switching means for disconnecting the interconnection when necessary.

2. Description of the Related Art

FIG. 6 shows general conventional power interconnection system shown, for instance, in the Japanese published unexamined patent application Sho 62-114435 as the prior art thereto. In the circuit of FIG. 6, an electric power system 7 comprises at least one generator 1, a transmission line 2 connected to the generator 1, a trunk distribution line 3 connected through a trunk line switch 4 to the transmission line 2, and branch line switches 6, 6, ... connecting the trunk distribution line 3 to the branch lines 5, i.e. feeders. Loads 8, 8, ... are connected to the branch lines 5, and each or at lease one branch line 5 is connected through a system interconnection switch 11 to a power converter 10, which is connected to a DC power output apparatus 9 for generating DC or storing power in DC.

In the above-mentioned configuration of the conventional general interconnection system for electric power, the electric power from the DC power output apparatus 9 is converted by the power converter 10 and fed through the system interconnection switch 11 to the loads 8, 8, .... And in case of maintenance checking or reconstruction or extension of the system, the interconnection system is disconnected by opening either of the trunk line switch 4 or the branch line switch 6 thereby to make the loads 8, 8, ... power-off state.

Distributed power sources which are to be interconnected by the power converter 10 are generally provided in the lower parts (i.e. in the part of loads) of the power system because of its sizes. In this case, the interconnected system may have such a dangerous state of islanding operation, that is inverse application of voltage from the power converter 10 when the switches 4 and 6 in the power system are opened. Therefore, accompanying to the opening of either of the switch 4 or switch 6 in the power system 7, the system interconnection switch 11 must be immediately opened, thereby to disconnect the interconnection. In this case, the system interconnection switch 11 is operated by auxiliary contacts of the switches 4 and 6. However, such system has an impractical problem that the wiring length is very long because the switches are located at very distant places.

On the other hand, the circuit of FIG. 7, which is the circuit of the invention disclosed and claimed in the above-mentioned Japanese unexamined published patent application Sho 62-114435, proposes a configuration that the state of no application of voltage from the electric power system 7 after opening of a switch 6 therein is detected by a power converter 10 itself, thereby to open an interconnection switch 11.

The configuration of the prior art circuit of FIG. 7 is elucidated hereafter. The same numerals as those used in FIG. 6 show corresponding parts and components.

The power converter 10 comprises an inverter 12 and an interconnection reactor 13 which is a winding of transformer including a reactance therein. Both ends of the reactor 13 are connected to a phase difference detector 14. And the phase difference of currents at both ends of the interconnection reactor 13 is detected from both ends as a phase difference between a first voltage signal $S_1$ and a second voltage signal $S_2$ both inputted to the phase difference detector 14. Output signal $S_3$ from the phase difference detector 14 is given to a first adder 98, whereto phase reference signal $S_0$ from a phase reference signal generator 15 is also added in opposite polarity. The output from the adder 98 is given to a phase controller 16 which contains an amplifier. Output signal $S_4$ of the phase controller 16 is given to a second adder 99, whereto an output $S_5$ from a periodical disturbance generator 20 is given. Output $S_6$ from the second adder 99 is given to an inverter controller 17, whose output is given to the inverter 12 thereby to control frequency of the output power of the inverter 12.

The operation of circuit of the prior art of FIG. 7 is as follows.

<1> When the switch 6 is closed, hence power converter 10 is interconnected to the electric power system 7 in FIG. 7.

The frequency of the interconnected system is controlled almost constant to the frequency of the generator 1 of the electric power system 7, because the capacity of the electric power system 7 is sufficiently larger than the capacity of the power converter 10. Therefore, no frequency fluctuation is given to the loads 8 by the interconnection of the power converter 10 to the electric power system 7. At this time, by taking the phase of the second voltage signal $S_2$ of the load side as reference of phase, the phase of the first voltage signal $S_1$ of the output of the inverter 12 is detected by the phase difference detector 14. And the phase difference detector 14 outputs the phase difference signal $S_3$ to the adder 98. Then the adder 98 gives a signal of difference between the present measured phase difference signal $S_3$ and the phase reference signal $S_0$ from the phase reference signal generator 15. And the adder 98 gives the subtraction signal therebetween to the phase controller 16. Then, output signal $S_4$ of the phase controller 16 is given to the second adder 99. At the second adder 99 the signal $S_4$ and a periodical disturbance signal $S_5$ from the disturbance generator 20 are summed and the resultant sum signal $S_6$ (a frequency instruction signal) is given to the inverter controller 17. The disturbance generator 20 outputs a signal of sinusoidal or triangular wave of very low frequency e.g. 1-2 Hz so as to give periodical shifting of frequency of the converted AC current from the inverter 12. Originally, the inverter 12 of the circuit of FIG. 7 is designed to shift the frequency of its output AC current in compliance with output of the disturbance signal $S_5$ from the periodical disturbance generator 20, given in the form of the control signal from the inverter controller 17.

The phase of the first voltage signal $S_1$ is time-integration of frequency of output voltage of the inverter 12. On the other hand, frequency of the second voltage signal $S_2$ is fixed to that of the large capacity generator 1 through the interconnection. Therefore, a kind of phase controlling closed loop is formed in the power converter 10. At that time, when the phase controller 16 sufficiently responds to periodical disturbance given by the disturbance generator 20 and has a high gain in a frequency range throughout the varying frequencies made by the disturbance signal, the input value of the phase controller 16 becomes substantially zero. That is, the phase difference signal $S_3$ (which shows phase difference between the both voltage signals $S_1$ and $S_2$) becomes equal to the phase difference instruction. (Though there is some small difference corresponding to an amount of disturbance signal $S_5$ divided by gain of the loop, such difference is negligibly small.) Therefore, the power supply amount to the load 8 is very stable. At that time, an offsetting signal $S_4$ appears from the phase controller 16 in a manner to offset the periodical disturbance $S_5$. Therefore, even though a frequency disturbance signal $S_5$ is given from the disturbance generator 20, the frequency instruction signal $S_6$ is not actually influenced but becomes substantially the same as the frequency of the load 8, and it is almost contant.

In this case, an electric power corresponding to the phase difference (represented by the signal $S_3$) between the voltage signal $S_1$ and $S_2$ is supplied to the load 8 from the power converter 10.

<2> When the switch 6 is opened, hence the interconnection between the electric power system 7 and the converter 10 is disconnected in FIG. 7.

In this state, electric power supply from the power converter 10 to the load 8 does not change. At this time, the phase difference signal $S_3$ output from the phase difference detector 14 is dependent on the size of the load 8, and the difference between the phase difference signal $S_3$ and the phase difference reference signal $S_0$ becomes constant. Output signal $S_4$ from the phase control circuit 16 is held to zero or to a constant value, when the phase reference signal $S_0$ and the phase difference signal $S_3$ are equal to each other ($S_0 = S_3$ when the switch 6 is opened in case there is no giving or receiving of power through the switch 6). On the contrary, when the phase difference signal $S_3$ is not equal to the phase difference reference signal $S_0$ (when the switch 6 is opened in case there is no giving or receiving of power through the switch 6), the output signal $S_4$ from the phase controller 16 becomes divergent. On the other hand, output signal $S_5$ from the disturbance generator 20 is impressed to the second adder 99 as it is. Therefore, level of the output signal $S_6$ of the adder 99 to the inverter controller 17 greatly changes responding to periodical disturbance signal $S_5$ from the periodical disturbance generator 20. Therefore, level of the input signal $S_6$ to the inverter controller 17 is changed greatly by means of the periodical disturbance given by the disturbance generator 20. Then, the frequency at the output end of the inverter 12 is changed greatly responding to the output of the periodical disturbance generator 20. The frequency of the current to the load 8 changes following the frequency change of the inverter 12, since function of fixing the frequency on the side of the load to the large capacity generator 1 has been lost by the opening of the switch 6. But, the phase difference output signal $S_3$ depends only on the current to the load 8, and therefore does not change. As a result, when there is no receiving or giving or electric power (e.g. power flow) through the switch 6, the periodical disturbance of the frequency of the current to the load 8 appears in the output current of the power converter 10. On the contrary, when there is giving or receiving of electric power (power flow) through the switch 6, the frequency of the output current of the power converter 10 becomes divergent (deviation of frequency becomes larger and larger in periodical changing).

Therefore, by selecting the disturbance signal $S_5$ from the periodical disturbance generator 20 larger than a value which makes a normal frequency fluctuation (ordinarily about 1% or less) which is detectable by the frequency abnormality detector 18, the abnormal frequency fluctuation outside the predetermined fluctuation range can be detected by the frequency abnormality detector 18. Thererfore, by means of the output of the frequency abnormality detector 18, the switch 11 is opened to disconnect the interconnection of the power system.

FIG. 8 is a circuit diagram of a case that plural number of power output apparatuses 9, 9, . . . are connected through respective power converters 10, 10, . . . .

In the figure, when the switch 6 is opened and hence the loads 8, 8, . . . are disconnected from the power system 7, the disturbances of respective converters may offset i.e., concel each other when their timings of periodical shift would opposite each other. In such case, the abnormality of frequency does not appear or belatedly appear. Alternatively, the frequency abnormality may appear very strongly when their timings of periodical shift would agree each other.

FIG. 9 shows a prior art example wherein a co-generator 21, such as a diesel engine generator, is connected parallel to the loads 8, 8, . . . .In the figure, in case the capacity of the co-generator 21 is sufficiently large in comparison with that of the power converter 10, there is the problem that undersirable interconnecting operation between the co-generator 21 and the load continues even after opening of the switch 6.

In the above-mentioned prior art interconnection systems, when plural number of converters 10, 10, . . . are connected to the electric power system 7, the frequency abnormality phenomena does not appear or appears very much belatedly. Therefore there is a problem that the intended disconnection of the interconnection system through detection of the frequency abnormality is difficult. And in case of connecting the co-generator in parallel to the load as in FIG. 9, because of frequency fixing to the co-generator frequency, the intended disconnection by utilization of the frequency abnormality becomes impossible.

OBJECT OF THE SUMMARY OF THE INVENTION

The present invention purposes to dissolve the above-mentioned problems of difficulties in disconnection of the interconnection system, and to provide an improved interconnection system capable of reliably disconnecting of the power converter from the electric power system.

The interconnection system for electric power system for interconnection between an electric power system and power converter in accordance with the present invention comprises:
 a frequency deviation detector for detecting frequency deviation of the converted AC power outputted from the inverter and issuing a first signal,
 a band-pass filter for passing a selected frequency band component from the first signal,
 an inert zone circuit for passing output signal from the band-pass filter only for the component having levels above a predetermined threshold level, thereby outputting a third signal, a control circuit for positively feeding back the third output signal and the output of the disturbance generator, thereby to increase frequency deviation of the converted AC power from the inverter, and an output abnormality detector for making a disconnection of the inverter from the interconnection with the electric power system, when frequency deviation of the inverter exceeds a predetermined reference value of frequency deviation, or when deviation of intensity of output current or output power of the inverter exceeds a predetermined reference level of deviation.

In the above/-mentioned interconnection system for electric power system, frequency of current to the load is fixed to that of the electric power system when the converter is interconnected to the electric power system, whereas when the interconnection is disconnected and the frequency variation becomes above the predetermined reference value of deviation the frequency variation is positively fed back thereby to increase frequency variation of the current to the load. And the positive-fed back increased frequency variation is detected, and thereby the interconnection of the power converter to the electric power system is disconnected certainly. Therefore undesirable inverse feeding of electric power is prevented.

Furthermore, in a case of providing a periodic disturbance generator for positively fed back the output of the periodic disturbance generator to increase frequency variation of the road current, also interconnection can be disconnected certainly.

According to the interconnection system for electric power system embodying the present invention, by positively fed back frequency variation component of a predetermined frequency range only, the loop gain of the phase controlling loop (24, 99, 16, 17, 12, 13) is made higher than 1. Therefore, the positive-fed back is stably obtained even when the plural power converters and/or co-generator are connected to the electric power system and the load. And satisfactory operation is obtainable such that, in the operation in the interconnected state the enough controllability is obtainable, whereas in the operation in the disconnected state the sufficient variation of frequency or road current is obtainable. Therefore, disconnection of the interconnecting switch can be made reliably, thereby preventing dangerous inverse feeding of power.

DESCRIPTION OF THE PREFERRED EMBODIMENT

Preferred embodiments are elucidated with reference to the accompanying drawings.

Figure 1:
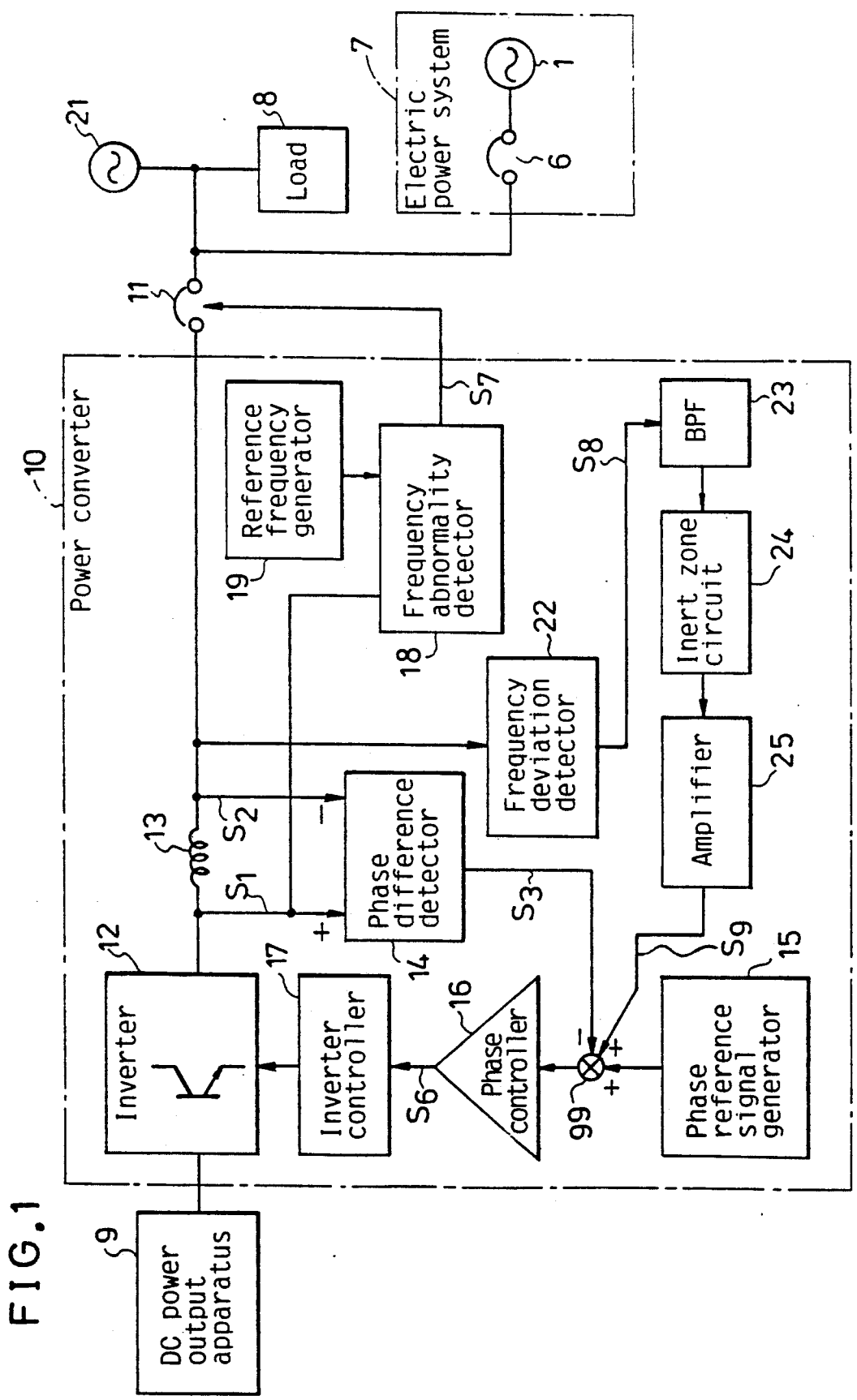
FIG. 1 is a circuit block diagram of a preferred embodiment of the present invention.

FIG. 1 is a circuit block diagram of a first embodiment. Therein an electric power system 7 and a power converter 10, which converts DC power output of a DC power output apparatus 9 into an AC power, are interconnected by an interconnection switch 11; and a load 8 and a co-generator 21, which is for instance a diesel engine generator, are interconnected with the above-mentioned interconnection system. The electric power system 7 comprises at least one generator 1 such as a power plant and a branch line switch 6. The electric power system 7, the load 8 and the co-generator 21, are connected through the interconnection switch 11 to the power converter 10. The power converter 10 comprises an inverter 12, which is for converting DC power from the DC power output apparatus 9 into AC power, and an interconnection reactor 13, wherethrough the inverted output power is outputted. Both ends of interconnection reactor 13 are connected to input terminals of a phase difference detector 14, so that a first voltage signal $S_1$ and a second voltage signal $S_2$ from the above-mentioned both ends are given to the phase difference detector 14. The phase difference detector 14 outputs a phase difference signal $S_3$ to an adder 99. The second voltage signal $S_2$ is further given to a frequency deviation detector 22. The frequency deviation detector 22 detects deviation $\Delta f$ of frequency of the voltage, at the interconnection switch 11, of the interconnected system, which comprises the electric power system 7, the co-generator 21 and the power converter 10. The frequency deviation $\Delta f$ is defined by a frequency difference with a reference frequency, such as accurate 60 Hz. The output signal $S_8$ of the frequency deviation detector 22 is a voltage which is proportional to the frequency deviation $\Delta f$. The voltage of the output signal $S_8$ of the frequency deviation detector 22 usually fluctuates making fluctuation of frequencies mainly of 2–3 Hz when the co-generator 21 is interconnected. The output signal $S_8$ is given through a band-pass filter 23 to an inert zone circuit 24. Then, output of the inert zone circuit 24 is amplified by an amplifier 25 and the amplified signal $S_9$ is given to the adder 99. A phase reference signal generator 15 gives a difference signal to the adder 99. The adder 99 gives its summed output signal to a phase controller 16. An output signal $S_6$ of the phase controller 16 is given to an inverter controller 17 which gives a control signal to the inverter 12 so as to control output power of the inverter 12. The first voltage signal $S_1$ is given to a frequency abnormality detector 18 and output of a reference frequency generator 19 is further given to the frequency abnormality detector 18. The frequency abnormality detector 18 outputs a frequency abnormality detection signal $S_7$ which drives the interconnection switch 11 to be disconnected. In the frequency deviation detector 22, the band-pass filter 23, the inert zone circuit 24, the amplifier 25 and the adder 99 is provided featuring the present invention, and it functions to make a positive feed-back under a special condition defined by the band-pass filter 23 and the inert zone circuit 24. The band-pass filter 23 is designed in a manner to pass only AC components in a narrow frequency band, for instance 2–3 Hz induced mainly by the interconnection of the co-generator 21. The inert zone circuit 24 functions to omit or cut out signal components within a predetermined level. Therefore, the component of the output signal $S_8$ reaches to the amplifier 25 only when the frequency fluctuations in under 3 Hz and that the fluctuation level is above the predetermined level.

Operation of the embodiment FIG. 1 is elucidated.

<i> When the branch line switch 6 is closed.

Figure 2:
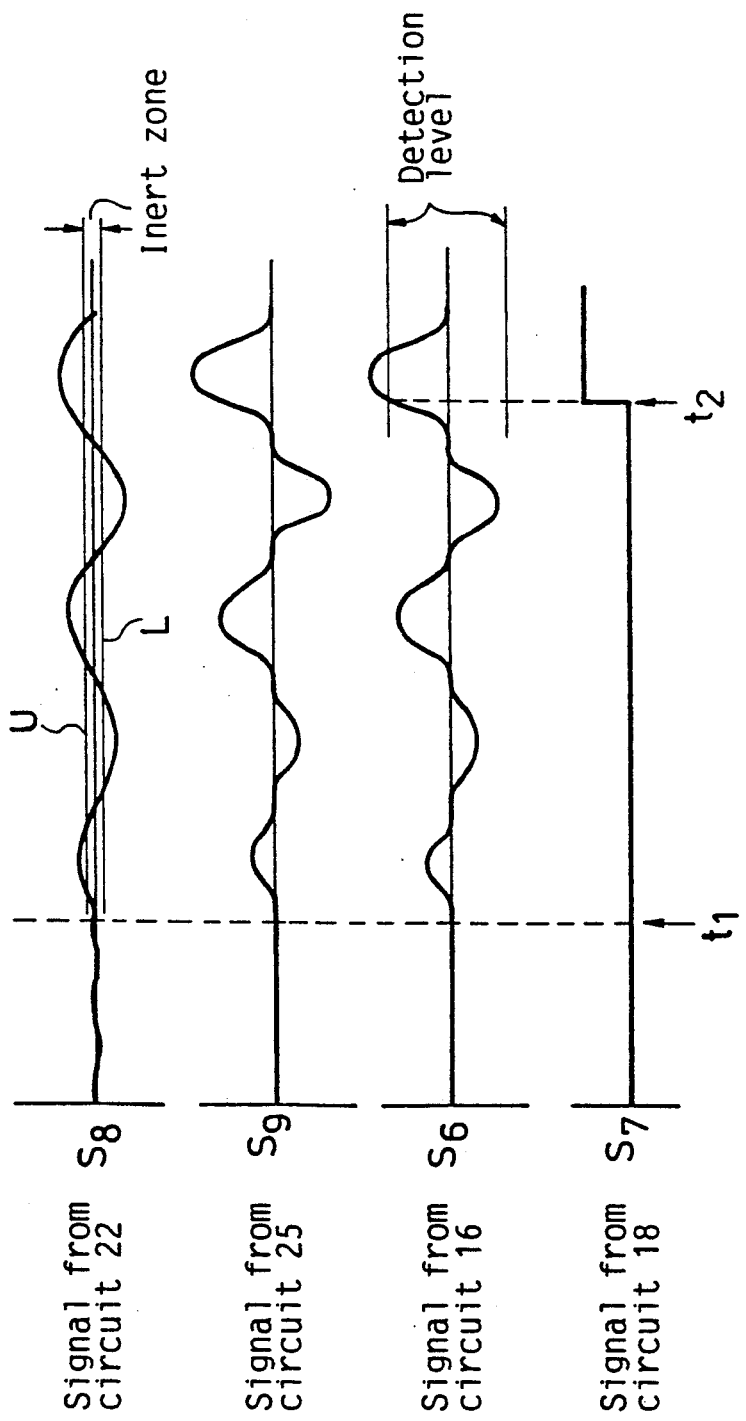
FIG. 2 is a time chart showing wave forms of various parts of the circuit of FIG. 1.

Since the branch line switch 6 and the interconnection switch 11 are closed, the power converter 10 is interconnected to the electric power system 7 and the co-generator 21. Therefore, electric power is supplied to the load 8 from the electric power system 7, from the co-generator 21 and from the power converter 10. Frequency deviation of the AC voltage of the interconnected system is detected by the frequency deviation detector 22. When the branch line switch 6 and the interconnection switch 11 are closed, the frequency of AC voltage is fixed to the frequency of the electric power system 7, and hence the deviation of the frequency detected by the frequency deviation detector 22 is small. The output signal of the frequency deviation detector 22 is given to the band-pass filter 23, and only the component of the frequency which is within the predetermined narrow band (e.g. 2–3 Hz) is passed to the inert zone circuit 24. The inert zone circuit 24 has such inert zone as shown in the wave-form $S_8$ of FIG. 2, wherein two horizontal lines U and L show upper and lower threshold levels of the inert zone. When the input signal $S_8$ to the inert zone circuit 24 exceeds (goes outside of) the inert zone defined by the threshold levels U and L, the components which exceed the threshold level U and L only are output from the inert zone circuit 24 and amplified by the amplifier 25, to produce the signal $S_9$ of FIG. 2. That is, the small amplitude components of the input signal $S_8$ are stopped by the inert zone circuit 24 and is not led to the amplifier 25. The output signal $S_9$ from the amplifier 25 is then summed at the adder 99 with the output signal $S_3$ and the output signal from the phase reference signal generator 15, thereby to produce a signal $S_6$ summed and given to the phase controller 16. The output signal $S_6$ from the phase controller 16 shown in the time chart $S_6$ of FIG. 2 is given to the inverter controller 17, which makes the inverter 12 change the frequency of converted AC current responding to the levels of signal $S_6$. Since the band-pass filter 23 and the inert zone circuit 24 are provided in the control loop to the inverter controller 17, an ordinary very small frequency fluctuation e.g. under 2–3 Hz inherent to the electric power system 7 does not make any output from the amplifier, and hence the phase controller 16 causes no frequency change of output to the inverter controller 17. Therefore, the ordinary small frequency fluctuation (e.g. under 2–3 Hz) in the electric power system 7 does not make any frequency change of the output AC current of the inverter 12. That is, the phase, hence the output AC power of the inverter 12 is controlled stable to a value corresponding to setting of the reference value of the phase difference which is set in the phase reference signal generator 15.

<ii> Next, when the branch line switch 6 is opened.

When the size of load 8 is sufficiently large in comparison with the power supply ability of the power converter 10 and the co-generator 21, an overload to the power converter 10 and to the co-generator 21 takes place, and hence frequency of output current thereof is lowered, and further their output voltage decreases. In the opposite case, namely when the power supply abilities of the power converter 10 and the co-generator 21 are sufficiently large in comparison with the size of the load 8, light-load takes place, and hence the frequency increases and the voltage also rises. Therefore by monitoring the voltage and frequency, a disconnection of the interconnection system can be found. However, when the power flow through the switch 6 is zero or very small, namely when the power consumption of the load 8 and the power supply from the co-generator 21 and the power converter 10 are almost balanced, neither prominent voltage change nor prominent frequency change appears at opening of the branch line switch 6.

Although the generator 1 has its inherent frequency fluctuation characteristic, in case of generator 1 of a large capacity in the utility electric power system, the absolute value of the frequency change is very small and is negligible. On the other hand, with respect to the co-generator 21, which is for supplying a portion of power for an electric power consumer, the capacity is relatively small. And it was found that the co-generator 21 generally has an inherent frequency fluctuation range, which is several times larger than that of the generator 1 of the utility electric power system 7, and it is for instance from 2 to 3 Hz. Therefore, when the branch line switch 6 is opened at the time of $t_1$ of FIG. 2, the frequency fluctuation which is inherent in the co-generator 21 appears. And hence, level fluctuation with a small frequency of several Hz (e.g. 2–3 Hz) appears in the output $S_8$ from the frequency deviation detector 22. By leading this output $S_8$ from the frequency deviation detector 22 to the band-pass filter 23, the AC component of limited frequency variation within the narrow frequency fluctuation range of 2–3 Hz is passed. Then output AC signal of similar waveform to that of $S_8$, is given to the inert zone circuit 24, to produce an output signal $S_9$ of FIG. 2. As aforementioned, the output $S_9$ of the inert zone circuit 24 is amplified to make an output $S_9$, and given through the adder 99 to the phase controller 16.

After the time $t_1$ of opening of the branch switch 6, the frequency fluctuation of several Hz (2–3 Hz) of the inverter 12 becomes actual, by the opening of the branch line switch 6 as shown in $S_8$ of FIG. 2. The frequency fluctuation induced AC signal, hence the variation of output of the phase controller 16 gradually increases as shown in the signals $S_9$ and $S_6$ of FIG. 2, owing to the below-mentioned positive feed-back in the power converter 10.

The process that the positive feed-back is made is as follows. Since the output signal $S_6$ of FIG. 2 which is output from the phase controller 16 causes to control frequency of the inverter 12 through the function of the inverter controller 17, the frequency of the output voltage of the inverter 12 varies responding to inherent fluctuation of frequency of the co-generator, thereby increasing frequency fluctuation at the output end point of the power converter 10. The above-mentioned increased frequency fluctuation further causes the output signal $S_9$, of the amplifier to have still increased fluctuation, and increase the frequency fluctuation further, making the positive feed-back. In summary, the frequency fluctuation increases through the positive feedback function of the loop circuit, which comprises the frequency deviation detector 22, the band-pass filter 23, the inert zone circuit 24, the amplifier 25, the adder 99, the phase controller 16, the inverter controller 17, the inverter 12 and the interconnection reactor 13. As a result of the increased frequency fluctuation, the frequency abnormality detector 18, which compares frequency at the first voltage signal $S_1$ and a reference frequency from the reference frequency generator 19, outputs a frequency abnormality signal $S_7$ to the interconnection switch 11 at the time $t_2$, as shown by the signal $S_7$ in FIG. 2. That is, at the time $t_2$, the level of output signal $S_6$ of the output of the phase controller 16 exceeds a predetermined abnormality detection level, which is correspondingly shown in the signal $S_6$ of FIG. 2. In summary, as shown in the time charts of FIG. 2, until the time $t_1$ of opening of the branch line switch 6 there is no change of signals $S_6$ and $S_7$, and after the time $t_1$ the signal $S_8$, makes gradual increase of the output fluctuation. Then responding to the fluctuation of the signal $S_{8'}$, the signals $S_{9'}$ and $S_6$ make variations, and the amounts of variations become divergent as time elapses owing to the positive feed-back. At the time $t_2$, the signal $S_6$ exceeds the predetermined detection level shown in FIG. 2, and hence the frequency abnormality signal $S_7$ becomes high level, and makes the interconnection switch 11 open. Therefore, the power converter 10 is disconnected from the electric power system 7, the load 8 and the co-generator 21.

When the branch line switch 6 is in the open state, the influence of the frequency fluctuation of the output AC current of the inverter 12 to the frequency of the load 8 depends on the values of the interconnection reactor 13 and reactance of the co-generator 21. Conventionally the influence to the load 8 is not so great because the reactance of the interconnection reactor 13 in the converter 10 is relatively large. But by appropriately selecting the gains of the amplifier 25 and the phase controller 16 in a manner to make the loop gain for the frequency fluctuation larger than 1, the positive feed-back in the loop is obtainable. As for the co-generator 21 of a large capacity, it is general that the interconnection system is configured to be disconnected by signal transmission. (That is, when disconnection is made, a signal for disconnection is transmitted in a manner to disconnect the switch between the co-generator and the electric power supply.) In case that the co-generators have relatively small capacities, it is ordinary to adopt such a disconnection system that by detecting the power supply from the co-generator to loads in the same electric power system, by using an inverse-power-flow-detection relay thereby to automatically disconnect the interconnection switch. In some case, when a number of distributed power source are provided, for instance a plurality of power converters are connected so as to supply AC power by utilizing solar cells, there are plural sub-power systems in one electric power system. In such case, the load is supplied with the power from other sub-power system in order to compensate the shortage of power from its co-generator. At that time there is a problem of failure to disconnect the interconnection because the necessary inverse supply of power is not constituted. Even in such special case, the present invention system operates reliably as follows: when the respective power converters as distributed power sources are disconnected, the co-generator easily becomes to overload state, and hence the disconnection of the interconnection is made easily and certainly.

Figure 1A:
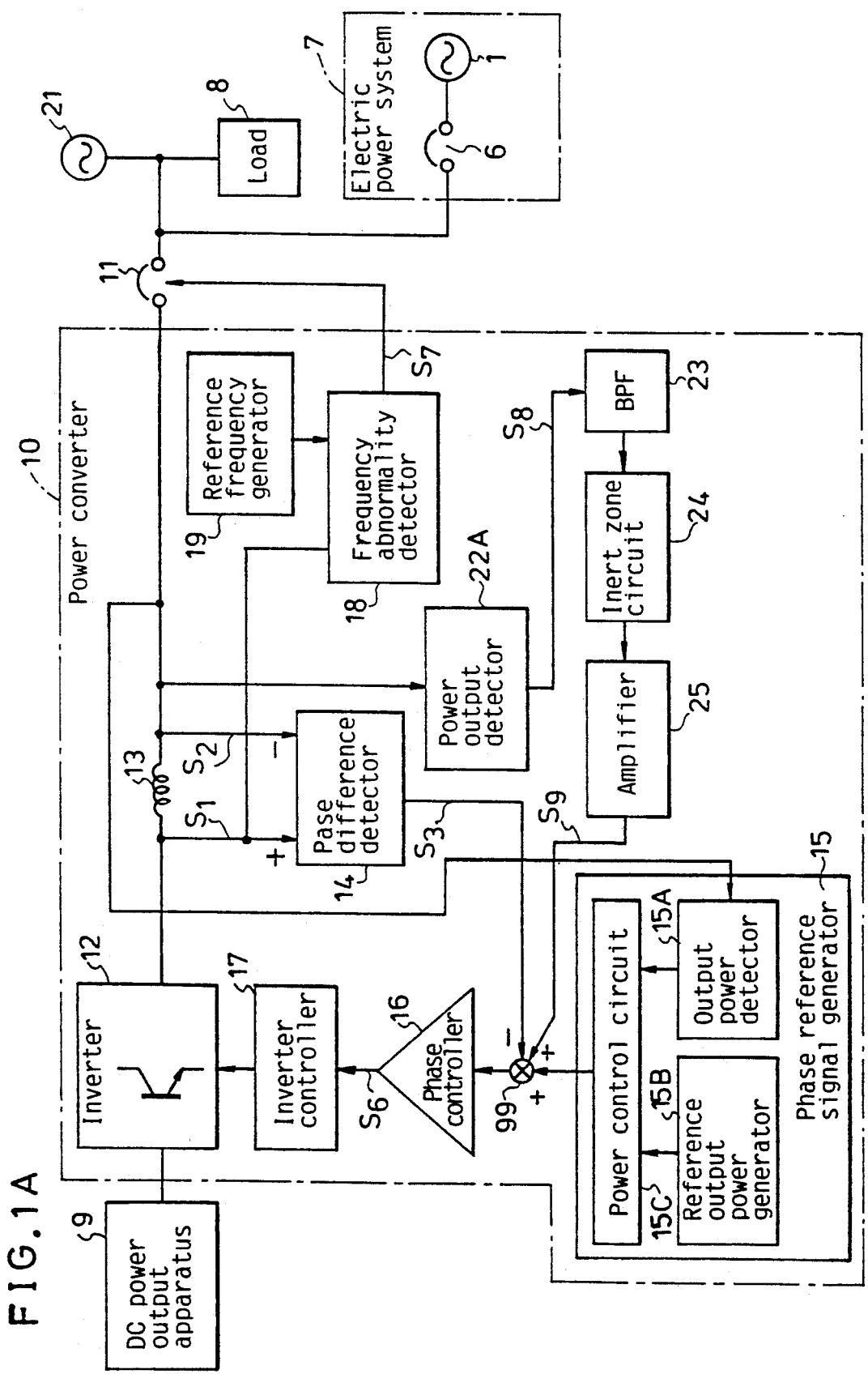
FIG. 1A is a circuit block diagram of the modified preferred embodiment of the present invention.

As a modified version of the phase reference signal generator 15 of FIG. 1, a modified embodiment may be configured as shown in FIG. 1A. In FIG. 1A, the phase reference signal generator 15 comprises an output power detector 15A for detecting output power of the inverter 12, a reference output power generator 15B and a power control circuit 15C, which compares outputs of the output power detector 15A and the reference output power generator 15B and outputs a phase reference signal to the adder 99. The power control circuit 15C outputs the phase reference signal in a manner to control the inverter controller 17 such that output power of the inverter 12 becomes a predetermined set value.

By configurating the phase reference signal generator 15 as above-mentioned, the phase reference signal generator 15 functions to issue its output to make the phase instruction signal $S_6$ be controlled so as to adjust the power to be supplied from the power converter 10 to the load 8 becomes a predetermined power amount.

The present invention is applicable to any types of system wherein output power of the power converter 10 is controlled by controlling the phase of the output voltage (which is equivalent to the frequency controlling).

Apart from the above-mentioned examples wherein co-generator(s) are provided, the present invention is applicable to still other modified case wherein a large size rotary machine(s) are connected in place of the co-generator(s).

Figure 3:
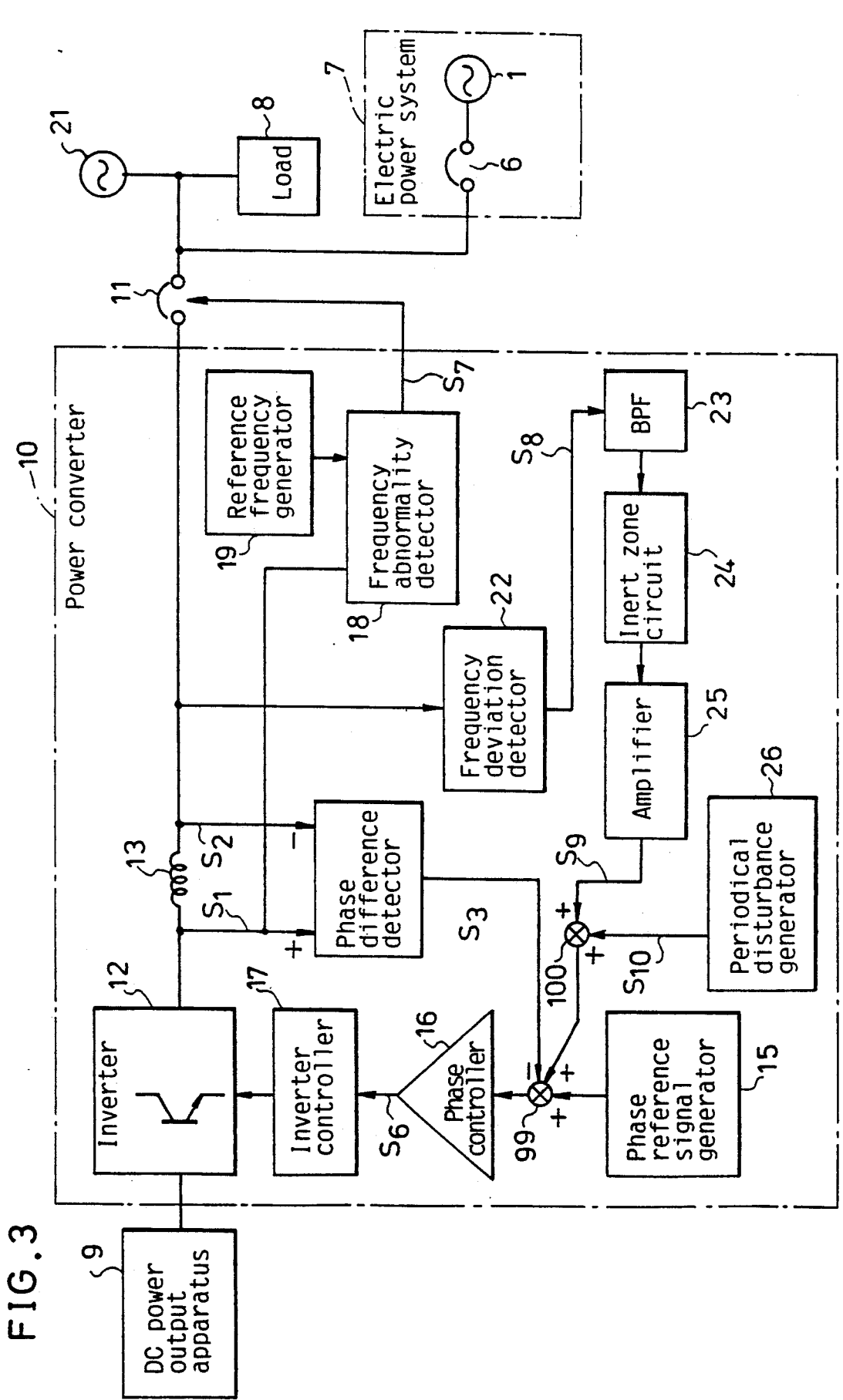
FIG. 3 is a circuit block diagram of another embodiment of the present invention.

FIG. 3 is a circuit block diagram of another embodiment. Corresponding parts and components to the first embodiment are shown by the same numerals and marks, and the description thereon made in the first embodiment similarly apply. Differences and features of this first embodiment from the first embodiment are as follows. In the embodiment of FIG. 3, a periodical disturbance generator 26 is provided to give its output disturbance signal $S_{10}$ of FIG. 4, to a second adder 100, which is provided between the output end of the amplifier 25 and the first adder 99. In this circuit, during the state of interconnection of the power converter 10 with the electric power system 7, a periodical disturbance of a specific very low frequency output signal $S_{10}$ (which is e.g. 2-3 Hz) generated by the periodical disturbance generator 26 is applied through the second adder 100 and the first adder 99 to the phase controller 16. Thereby the frequency of the output current of the inverter 12 is varied responding to the periodical disturbance of the signal $S_{10}$. That is, the frequency of the output power varies responding to the periodical disturbance. Therefore, of course the output power of the inverter 12 varies responding to this periodical frequency variation. However, the variation of the output power does not make substantial influence to the ordinary interconnection operation, when output level of the periodical disturbance generator 26 is selected to such a level that the percentage of the variation amount of the output power of the inverter 12 to the installed capacity should be about several %. Furthermore, even if the frequency of the output power of the inverter makes small fluctuation, there is no substantial influence to the frequency of the electric power system 7, since the latter frequency is fixed to the frequency of the large generators of the electric power system 7.

When the branch line switch 6 is opened, by means of frequency fluctuation of the output current of the inverter 12 the frequency fluctuation at the load 8 becomes noticeable (namely, exceeds the predetermined threshold levels U and I) though its amount is small. This frequency fluctuation component is positively fed back in the feed-back loop in the power converter 10, and the frequency fluctuation becomes larger and larger. Time chart of FIG. 4 shows process of the positive feed-back operation.

Figure 4:
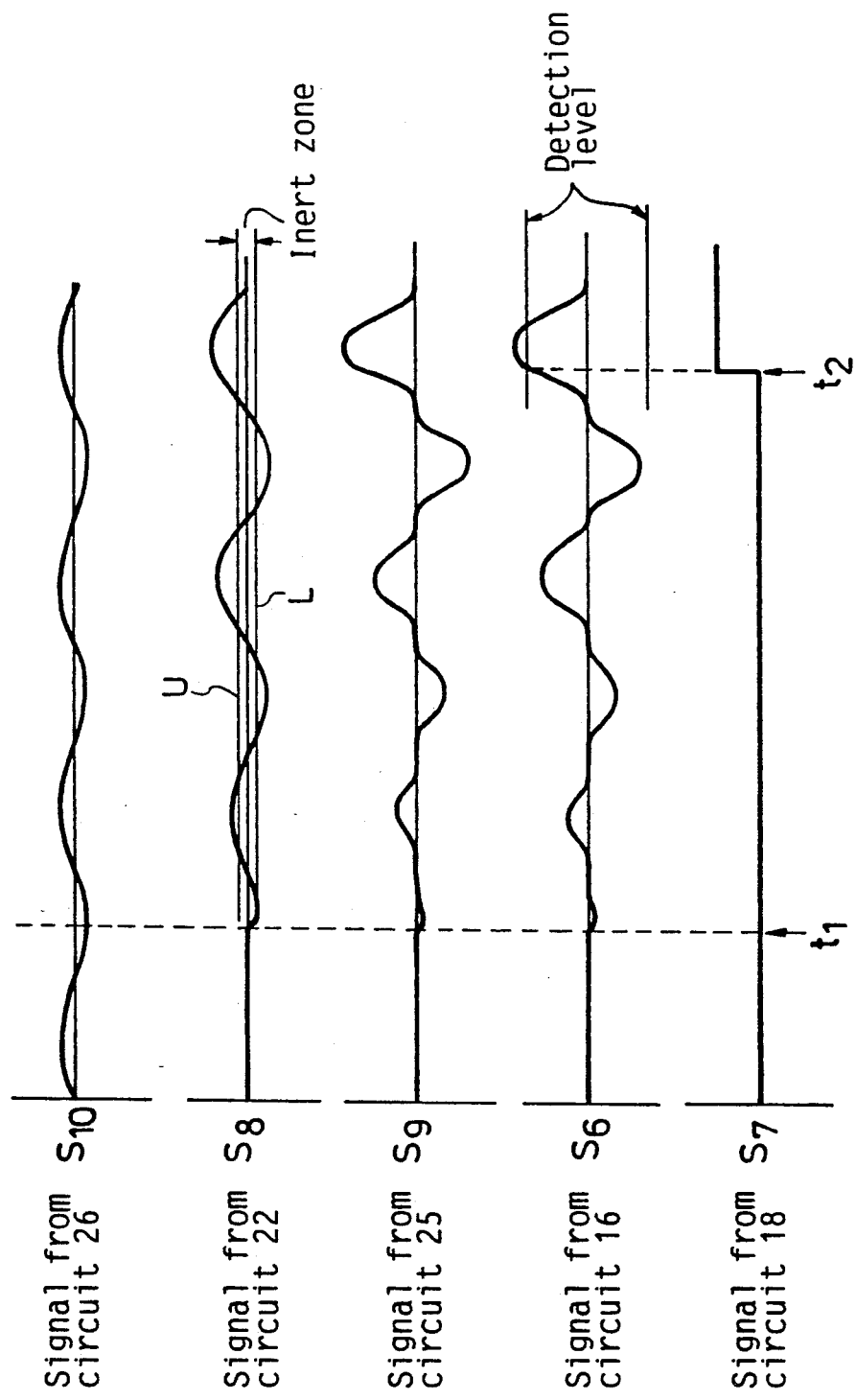
FIG. 4 is a time chart showing wave forms of various parts of FIG. 3.

As shown in the time charts of FIG. 4, until the time $t_1$ of opening of the branch line switch 6, there is no voltage change in signals $S_6$ and $S_7$, and after the time $t_1$ the signal $S_{8'}$ makes gradual increase of the output fluctuation. Then responding to the fluctuation of the signal $S_{8'}$, the signals $S_9$ and $S_6$ makes fluctuation and degree of fluctuation becomes divergent as time elapses, owing to the positive feed-back. At the time $t_2$, the signal $S_6$ exceeds the predetermined level shown in FIG. 4, and hence the frequency abnormality signal $S_7$ becomes high level, and makes the interconnection switch 11 open. Therefore, the power converter 10 is disconnected from the electric power system 7.

The above-mentioned configuration of the example of FIG. 3 is effective for both cases having co-generator(s) 21 and excluding co-generator(s) 21.

When there is no co-generator in the same system with the power converter 10 but there are plural distributed power sources, for instance, power converters 10, 10, ... having solar batteries as its DC power source, by giving the periodical disturbance from the periodical disturbance generator 26 in the power converter is specially effective.

In case the system has the co-generator, its own output frequency functions to trigger an increasing of frequency variation in the interconnection system. That is, when the cycle of the low frequency output signal $S_{10}$ from the periodical disturbance generator 26 is selected to agree with the cycle of inherent frequency variation of the co-generator, the variation of frequency is increased.

Waveform of output signal $S_{10}$ of the periodical disturbance generator 26 may be triangular wave, besides the sinusoidal wave shown in FIG. 4.

Figure 5:
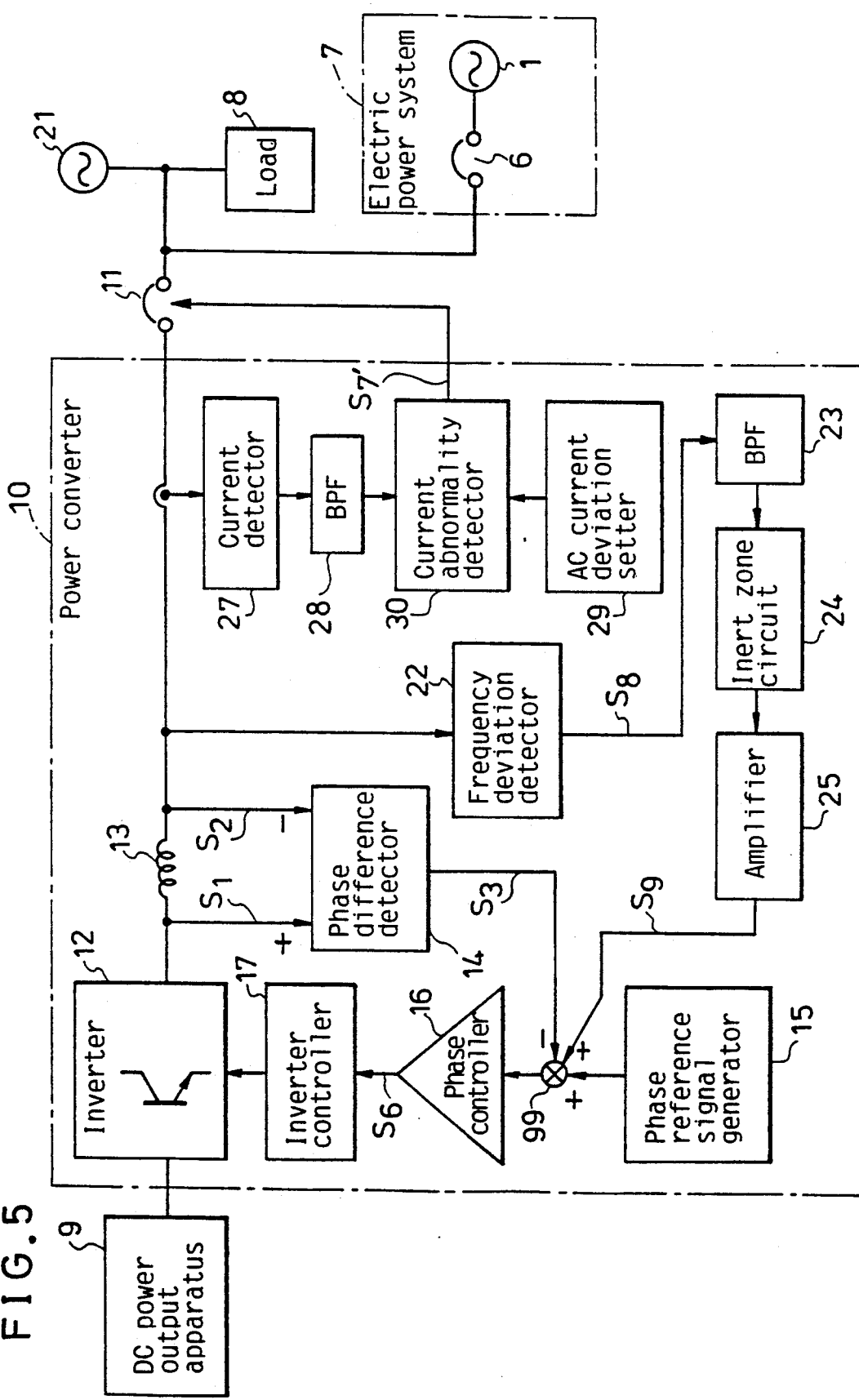
FIG. 5 is a circuit block diagram of a still other embodiment of the present invention.
Figure 6:
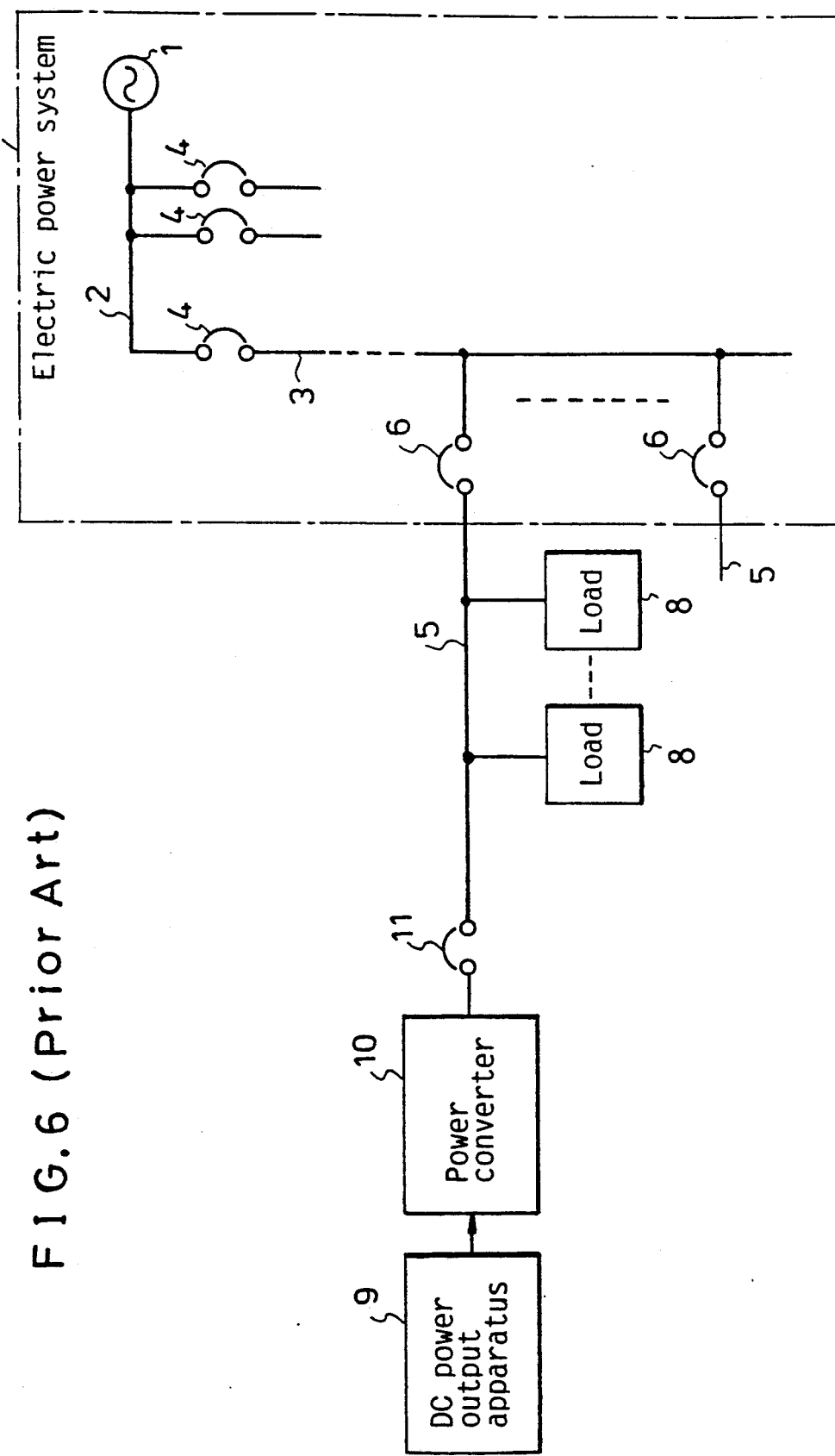
FIG. 6 is the circuit block diagram of the well known general prior art of interconnection for electric power system.
Figure 7:
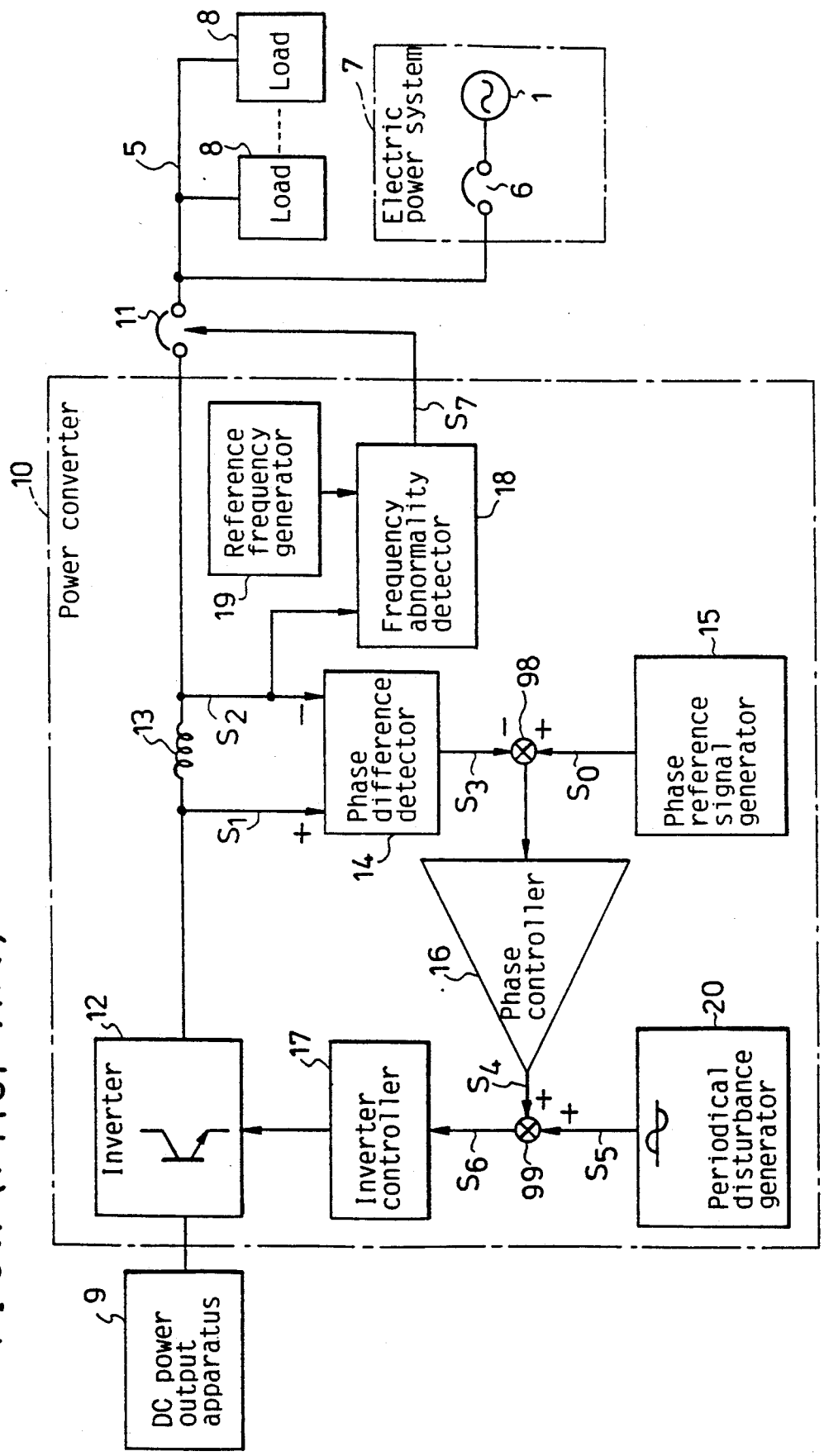
FIG. 7 is the circuit block diagram of the prior art interconnection for electric power system which is shown and claimed in the Tokkai Sho 62-114435.
Figure 8:
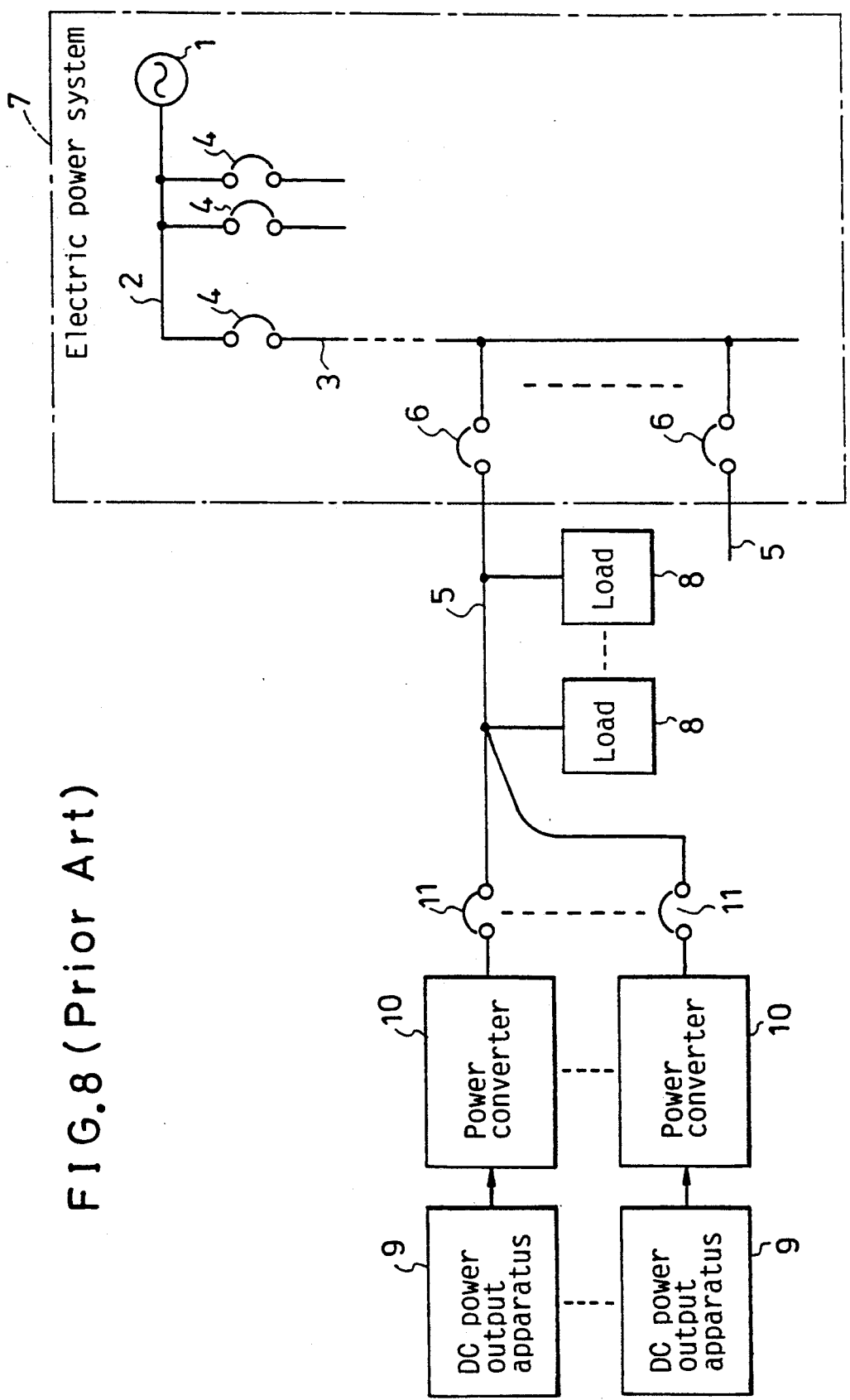
FIG. 8 is the circuit block diagram showing the conventional interconnection for electric power system wherein plural power converters (10, 10) are interconnected.
Figure 9:
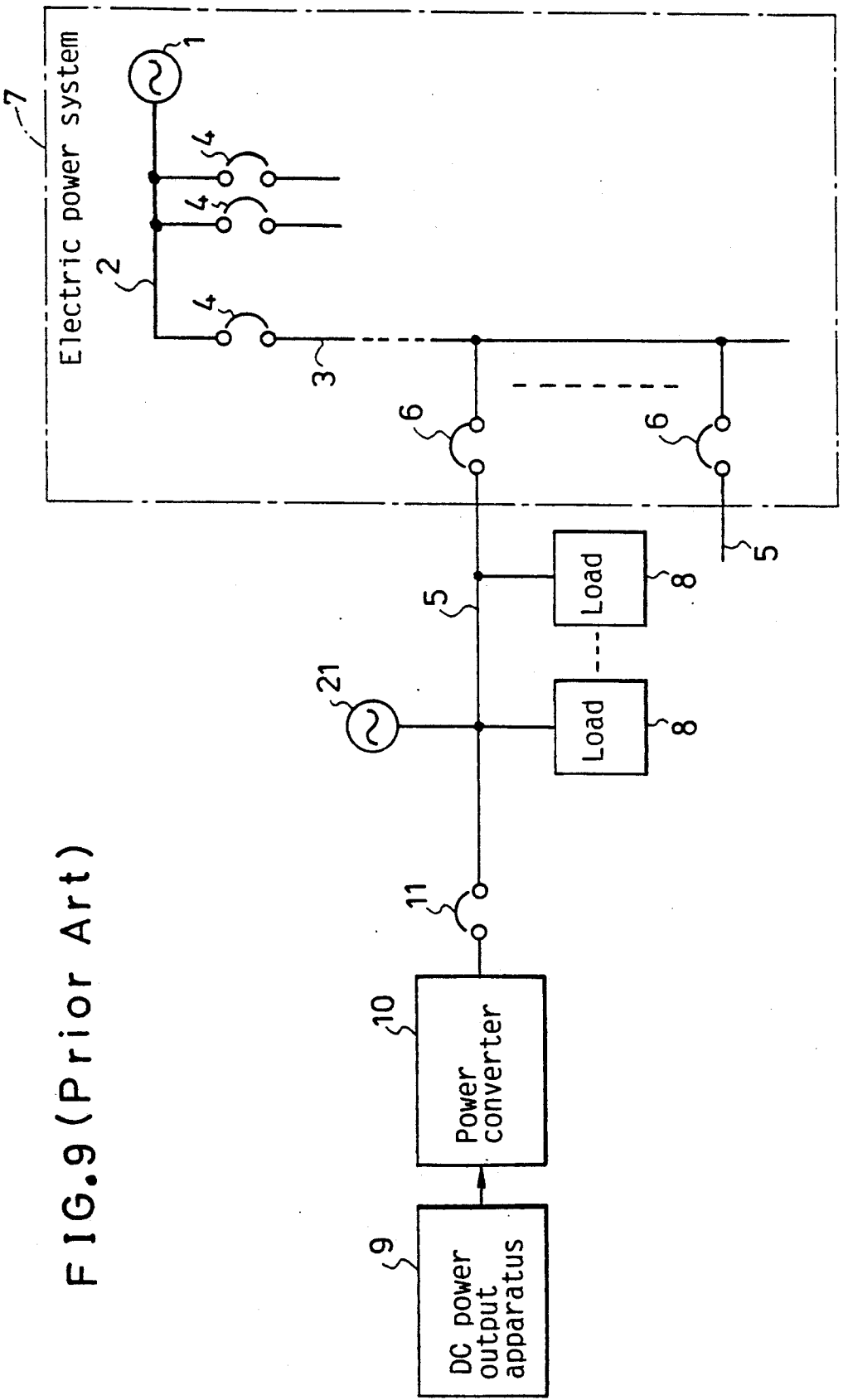
FIG. 9 is the circuit diagram of the conventional interconnection system having the co-generator (21) connected thereto.

FIG. 5 is a block diagram of a still other embodiment of the invention. In this embodiment, as a detection means for the system disconnection, means to detect intensity of the AC output current of a specific frequency band is adopted, in place of the means for detection of the frequency abnormality as in the above-mentioned examples of FIG. 1 and FIG. 3. That is, the disconnection switch 11 is to be disconnected when the current intensity of the power converter 10 becomes outside a predetermined level, and the interconnection is disconnected.

The circuit of FIG. 5 has a current detector 27 which detects intensity of output current of the power converter 10 and gives its output to a second band-pass filter 28, which has a narrow pass-band such as $3 \pm 60$ Hz. Then output of the band-pass filter 28 is compared with a reference value of the AC current given from a reference AC current generator 29 at a current abnormality detector 30. And the output signal $S_{7'}$ of the current abnormality detector 30 is given to the interconnection disconnector switch 11, to make the disconnection of the switch 11.

The operation of the embodiment of FIG. 5 is as follows.

When the branch line switch 6 is opened, the frequency of the output current of the inverter 12 is varied responding to frequency of some frequency determining means (for instance, the co-generator 21 in case of the circuit of FIG. 1, or the periodic frequency disturbance generator 26 in case of the circuit of FIG. 3). And the frequency variation is gradually increased by the positive feed-back, as described with reference to FIG. 1 and FIG. 3. The variation of the frequency of the output current of the inverter 12, induces corresponding variation of the output current of the inverter 12. In this embodiment, fluctuation component of a particular frequency is detected, and intends to detect the component at the time when its level is above a predetermined level.

The AC output current is detected by the current detector 27, and led to the second band-pass filter 28, which detects the current of the same frequency component as that of the frequency fluctuation. Output of the second band-pass filter 28 is then compared with output of the reference AC current generator 29. When output of the second band-pass filter 28 exceeds the output level set by the reference AC current generator 29, the current abnormality detector 30 generates an output, which drives the interconnection switch 11 to be disconnected.

This embodiment of the type which detects the current abnormality has higher reliability of detection and more simple circuit configuration than the embodiments of detecting the frequency deviations, since the deviation of the current intensity makes sufficiently large output in comparison with the deviation of the frequency. Therefore the current-intensity deviation-detection is applicable in place of the frequency abnormality detection circuit in the aforementioned embodiments of FIG. 1 and FIG. 3.

Furthermore, apart from the embodiments of FIG. 1, FIG. 3 and FIG. 5, wherein the frequency deviation detector 22 detects deviation of frequency components of the output AC current to make the disconnection of the interconnected system, such other modification may be used with the equivalent technical advantages, as those which uses detection of: deviation of AC output power from the power converter 10, or deviation of DC input current or power from the DC power source 9 to the power converter 10.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. Interconnection system for electric power system for interconnection between an electric power system and a power converter which includes an inverter for converting a DC power into a converted AC power, thereby to supply AC power to a load or loads from said electric power system and said inverter, said interconnection system comprising:

a frequency deviation detector for detecting frequency deviation of said converted AC power outputted from said inverted and issuing a first signal, a band-pass filter for passing a selected frequency band component from said first signal, an inert zone circuit for passing output signal from said band-pass filter only for the component having levels above a predetermined threshold level, thereby outputting a third signal, a control circuit for positively feeding back said third output signal, thereby to increase frequency deviation of said converted AC power from said inverter, and an output abnormality detector for making a disconnection of said inverter from said interconnection with said electric power system, when frequency deviation of said inverter exceeds a predetermined reference value of frequency deviation, or when deviation of intensity of output current or output power of said inverter exceeds a predetermined reference level for deviation.

2. Interconnection system for electric power system for interconnection between an electric power system and a power converter having an inverter for converting a DC power into a converted AC power, thereby to supply AC power to a load or loads from said electric power system and said inverter, said interconnection system comprising:

a frequency deviation detector for detecting frequency deviation of said converted AC power outputted from said inverter and issuing a first signal, a band-pass filter for passing a selected frequency band component from said first signal, an inert zone circuit for passing output signal from said band-pass filter only for the component having levels above a predetermined thershold level, thereby outputting a third signal, a disturbance generator for outputting a signal to make a small fluctuation of frequency of said selected frequency band component, a control circuit for positively feeding back said third output signal and the output of said disturbance generator, thereby to increase frequency deviation of said converted AC power from said inverter, and an output abnormality detector for making a disconnection of said inverter from said interconnection with said electric power system, when frequency deviation of said inverter exceeds a predetermined reference frequency deviation, or when deviation of intensity of output current or output power of said inverter exceeds a predetermined reference level for deviation.

* * * * *